Aug. 22, 1950 — A. P. KING — 2,520,008
RADIO MARKER SYSTEM
Filed April 5, 1940 — 2 Sheets-Sheet 1

INVENTOR
A. P. KING
BY N. D. Ewing
ATTORNEY

Aug. 22, 1950   A. P. KING   2,520,008
RADIO MARKER SYSTEM
Filed April 5, 1940   2 Sheets-Sheet 2
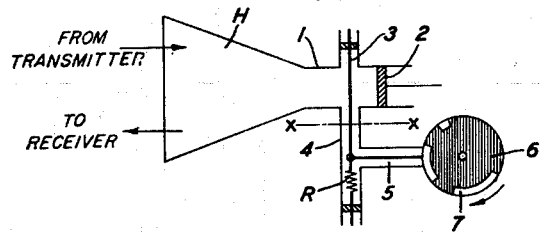
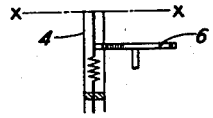
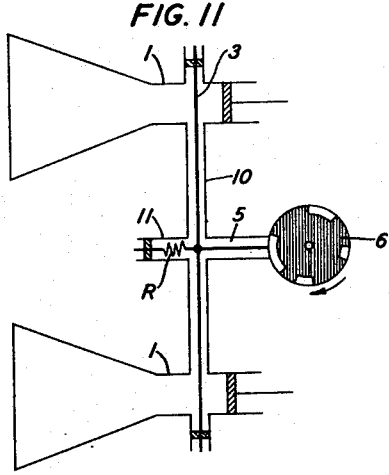
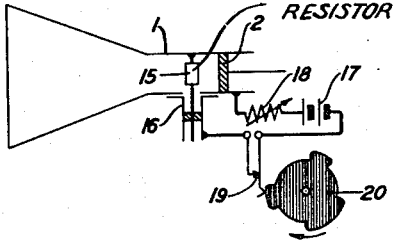
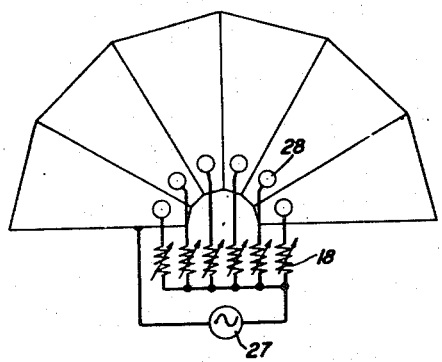
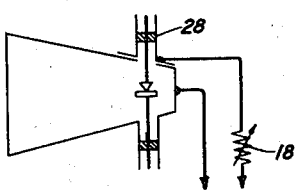
INVENTOR
A. P. KING
BY
N. A. Ewing
ATTORNEY Patented Aug. 22, 1950

2,520,008

UNITED STATES PATENT OFFICE 2,520,008

RADIO MARKER SYSTEM

Archie P. King, Red Bank, N. J., assignor to Bell Telephone Laboratories, Incorporated, New York, N. Y., a corporation of New York Application April 5, 1940, Serial No. 328,003

23 Claims. (Cl. 343—18)

This invention relates to ultra-high frequency radio systems and more particularly to systems utilizing radio wave reflectors in their operation.

It has been proposed heretofore that channels or routes for watercraft, aircraft and other vehicles be outlined or marked by devices capable of reflecting a radio wave back to its origin. In accordance with this proposal, a vehicle traversing a course so marked is provided with apparatus for transmitting a beam of radio waves in any desired direction and with radio receiving means for indicating when the beam strikes a reflector and is returned to the vehicle.

A principal object of the present invention is to provide for the identification of the several radio reflectors along a course so that from the vehicle each may be distinguished from the others.

In accordance with the present invention the objective stated and others that will appear hereinafter are achieved by providing means at a radio reflector for modifying the radio waves returned to the vehicle in a manner that is susceptible of detection and that is individual to or characteristic of the particular reflector. Of the various parameters which might serve to distinguish or characterize a radio wave, such as polarization, frequency or frequency composition, amplitude and the variations of each of these parameters with respect to time, the amplitude-time characteristic appears most readily susceptible of application to the present purpose. Otherwise stated, it is proposed in accordance with the invention that the radio wave incident upon a reflector be time-modulated, and more particularly amplitude-modulated, in a particular manner peculiar to that reflector. The amplitude modulation, which may take the form of a simple telegraphic code symbol, for example, may be effected by various means, such as those hereinafter described in which the incident wave is variably absorbed in an electrical system at the reflector to impress an outline of the code symbol on the reflected wave.

The nature of the present invention will appear more fully in the following description of the typical embodiments illustrated in the accompanying drawings.

It has been found that the metallic horn, heretofore proposed as a device for launching or intercepting ultra-high frequency radio waves, has the property when properly terminated of efficiently reflecting radio waves entering its mouth back toward their point of origin.

This type of reflector is well adapted to serve as a reflector marker in a course marking system of the kind hereinbefore outlined and it lends itself especially well to application of the reflector identifying means in accordance with the present invention. Although the several embodiments of the invention herein disclosed all utilize reflectors of the horn type, it will be understood that the invention is applicable also where other appropriate types of reflectors are employed.

The metallic horn as heretofore proposed in its application as a transducer for launching or intercepting radio waves has assumed a wide variety of forms. Among these may be mentioned the conical horn of circular cross-section, the pyramidal horn of rectangular cross-section and the so-called sectoral horn conforming with a cylindrical sector. In each case means are provided in the throat end of the horn or connected as a throat extension for exciting the horn or for receiving the wave power intercepted by the horn. In its application as a radio wave reflector, the exciting or receiving means mentioned is replaced with a reflecting termination, that is, means are provided at the throat end of the horn for presenting an impedance discontinuity to the wave entering the mouth. The simplest form of termination for this purpose comprises a metal plate closing off the throat of the horn.

The directional characteristics of the metallic horn depend on its proportions and especially the relation between the proportions and the operating radio wave-length. Thus the horn may be designed to radiate waves with high axial gain, that is, with the wave energy largely confined to the axial direction. A horn so designed exhibits corresponding directional selectivity as a radio wave receiver. Such a horn likewise when operated as a radio wave reflector exhibits similar directional characteristics so that the received wave energy is much higher when the radio wave source and receiver are aligned with the axis of the horn than when they are not so aligned. Alternatively the metallic horn can be designed to yield a fairly wide directional pattern, but with reduced gain, so that when the horn is used as a reflector marker the radio beam transmitter and associated receiver may lie anywhere within a fairly wide angular range.

Figure 1:
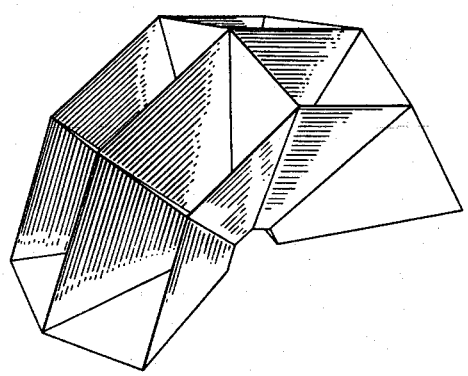
Figs. 1 to 5 show various preferred forms which the reflector may take.

To retain the advantages of the horn designed for high axial gain and at the same time to realize the advantages of wide angular coverage, a plurality of horns each designed for high axial gain may be arrayed as in Fig. 1, for example, with each horn covering a portion of a wide angular range. Over this range the array is highly effiecient in reflecting a wave impinging upon it back in the direction of its arrival. The array shown in Fig. 1 comprises two sets of four pyramidal horns each, the horns of each set being arranged in a semicircle with one vertical side wall shared by a horn of the other set. This array is adapted for use as an airways course marker. One or more of the arrays may be arranged on the ground along the course to be followed by aircraft, and the latter may be provided with an ultra-high frequency radio beam transmitter variable as to its direction of radiation and a cooperating receiver adapted to indicate when the transmitter is aligned with the reflector array.

Figure 2:
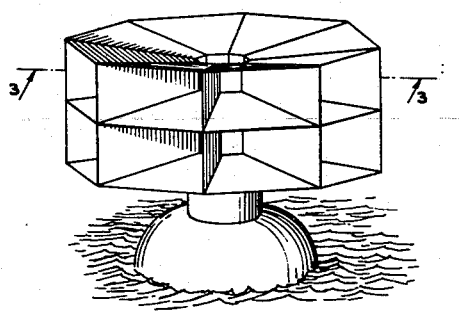
Figure 3:
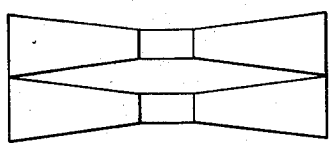

Whereas the reflector array shown in Fig. 1 covers an angular range of 180 degrees, the array may be extended as shown in Fig. 2 to provide coverage over an angular range of 360 degrees. In this case the array lies in a horizontal plane and is mounted on a float so that it is adapted for marking a water course. In this use of the array the radiated and reflected waves will lie substantially in a horizontal plane. Hence as shown schematically in Fig. 3 each circular array of horns may be so aligned that the direction of maximum reflective effect will coincide with the horizontal plane.

Figure 4:
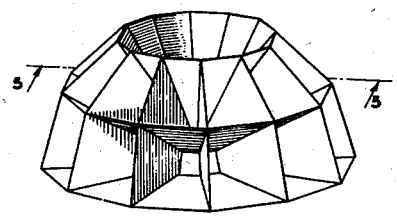
Figure 5:
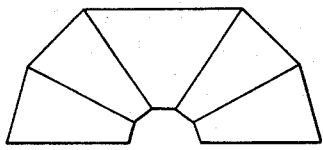

A further extension of the principle of arraying reflector horns is illustrated in Fig. 4 and in diagrammatic cross-section in Fig. 5. Here a plurality of horns of approximately rectangular cross-section are arranged contiguously with each other within a roughly hemispherical outline. If the horns are arranged circularly in a plurality of layers as shown, the horns may be so proportioned that the space remaining in the top can be used also to form an upwardly directed horn-like reflector of polygonal cross-section.

Figure 7:
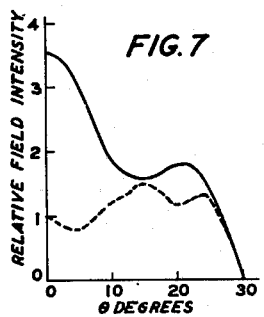
Figs. 6, 7 and 8 are curve diagrams illustrating certain transmission characteristics of horn type reflectors; and, Figs. 9 to 15 illustrate various modifications of the invention in which amplitude modulation is introduced.
Figure 6:
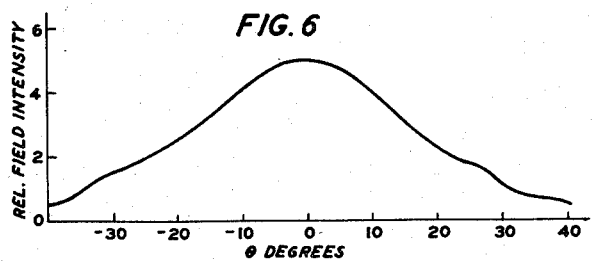
Figure 8:
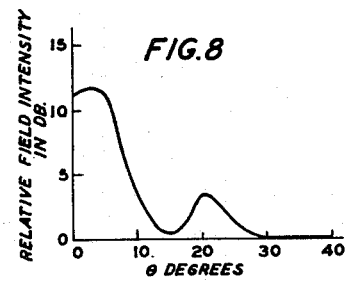

Fig. 6 represents diagrammatically the directional characteristics of a typical metallic horn of rectangular cross-section designed for radiation with substantially maximum axial gain. Along the axis of the horn, corresponding to the zero point on the axis of abscissae, the radiated field intensity is maximum. At points angularly removed from the axis the field intensity is lower and is reduced to a substantially negligible value for points 30 degrees on either side of the axis of the horn. With the same horn terminated by a reflecting cap at the throat end, a radio beam was directed from a distance toward the mouth of the horn and a radio receiver in the vicinity of the transmitter was utilized to measure the intensity of the reflected wave. The intensity of the latter was found to vary with the angular separation between the transmitted beam and the axis of the reflector horn in the manner shown by the solid line in Fig. 7. This solid line curve shows that the reflected wave was maximum when the transmitter and receiver were aligned with the axis of the reflector horn and that the reflected wave intensity dropped to substantially zero when the angular separation between the axis of the reflector and the transmitter was 30 degrees. The reflector cap was then replaced with an energy absorbing termination and the measurements were repeated whereupon it was found that the intensity of the reflected wave at the receiver varied in the manner shown by the dotted line in Fig. 7. Fig. 8 shows the logarithmic ratio of the field intensity obtained in the two measurements and it affords an indication of the discrimination at the receiver between termination of the horn as a reflector and termination as an energy absorber. It further demonstrates the practicability of identifying a reflector horn by terminating it alternately as an absorber and as a reflector in accordance with a preassigned code.

Although as hereinbefore indicated there are a variety of methods which may be utilized to operate on an intercepted wave to identify the reflector by which it is returned, I have chosen to present in this application several illustrative examples involving modulation of the intercepted waves. More particularly the modulation is in the form of amplitude modulation effected by variable absorption of the incident waves. One such example of practice is illustrated schematically in Fig. 9.

The reflector marker shown schematically in Fig. 9 comprises a metallic horn H the throat end of which is continued as a hollow metal pipe I which in turn is closed by an adjustable metallic piston 2. Extending transversely through the pipe I is a conductor 3 which is aligned with the electric field of the incident wave and which continues in both directions outside of the pipe I as the inner conductor of a coaxial conductor system 4. The latter is closed at each end by a longitudinally adjustable short-circuiting piston. In one of the coaxial conductor branches a resistor R is interposed in the inner conductor. Extending from the same coaxial branch from a point between pipe I and resistor R is another coaxial conductor line 5, the length of which is an integral number of half wave-lengths at the operating radio frequency. With the distant end of line 5 opened, the short-circuiting pistons in the coaxial system are so adjusted as to provide for maximum absorption of the wave power entering the horn H. If now the distant end of line 5 is short-circuited, low impedance will virtually short-circuit the resistor R and very little of the wave power will be absorbed. In this condition the combination operates efficiently as a reflector. To provide for periodic short-circuiting of the line 5, a disc 6 of insulating material with metallic segments 7 on its periphery is arranged at the end of line 5 so that on rotation of the disc the metallic segments short-circuit the conductors of line 5 in accordance with a code sequence. Any suitable driving means may be provided for continuously rotating the disc 6.

From the foregoing description of Fig. 9, it will be evident that when a metallic segment 7 short-circuits the line 5, the horn H is so terminated as to be a good reflector and the reflected wave received at a distance will be of relatively high intensity, whereas if line 5 is not so short-circuited, the horn H will be so terminated as to be a good radio wave power absorber and the received field at a distance will be relatively low or negligible. Each reflector marker in accordance with Fig. 9 may have a different arrangement of the segments 7 so that they impress different code symbols on the reflected wave.

Fig. 10 shows a modification of Fig. 9 in which the disc 6, rotating about an axis parallel with the coaxial system 4, enters directly a transverse slot in the outer conductor of the coaxial system 4 so that the segments 7 intermittently provide a metallic connection between the inner and outer conductors.

A plurality of horns can be operated simultaneously, each in the manner of Fig. 9, by branching from the junction between conductor 3 and line 5. Where two horns comprising an array are to be operated simultaneously, the respective conductors 3 are joined to form the inner conductor of a coaxial system 10 connecting the two horns as in Fig. 11. At the midpoint of the line 10 there is a branch coaxial line 11 terminated in an adjustable short-circuiting piston with the resistor R interposed in the central conductor of that branch. Line 5, which branches from the same point, and its associated disc 6 serve as described with reference to Fig. 9 to periodically short-circuit the absorbing element R.

In lieu of the terminating resistor and variable short-circuiting means of Fig. 9, an element having a non-ohmic resistance may be provided together with electrical means for intermittently varying the resistance thereof. In the example shown in Fig. 12, the non-ohmic resistor is a thermistor 15 which may be a boron bead, filamentary silver sulphide or other device having a high temperature coefficient of resistance. The thermistor is interposed in a diametral conductor in the pipe 1 connected to the throat of the horn. The conductor extends in one direction through the wall of the pipe 1 and forms the inner conductor of a coaxial conductor line 16 which is conductively short-circuited by a longitudinally adjustable piston. The outer conductor of the line 16 is insulated from the pipe 1 at their junction so that by connection across the junction a circuit may be provided for passing direct or low frequency current through the thermistor 15. This low frequency circuit comprises a battery 17, an adjustable series resistance 18 and switch 19. Resistor 18 is to be adjusted to such value that the resistance of thermistor 15 is appropriate for maximum absorption of wave power entering the horn. With the current from battery 17 interrupted by opening switch 19, the resistance of thermistor 15 is caused to assume a widely different resistance value, whereupon it becomes a poor energy absorber and most of the wave power entering the horn is reflected. To change from the absorbing to the reflecting condition intermittently, a rotating cam 20 is arranged to open and close switch 19 in accordance with a telegraphic code symbol for example.

Fig. 13 is the same in general outline as Fig. 12 with several exceptions. First, a non-linear element such as a crystal or diode or copper-oxide rectifier 21 is interposed in a diametral lead in pipe 1 and external connection is made to a wave source 22. The latter may produce an electrical current of any suitable frequency, for example an audio frequency current that is transmitted through the rectifier 21 to change the resistance thereof at an audio frequency rate. The elements are so proportioned that at one point of the audio frequency cycle, the resistance of rectifier 21 is such as to form an efficient energy absorbing combination and at other points to present an impedance mismatch so that a high degree of reflection occurs. Radio waves incident on the horns are therefore tone-modulated and the pitch of the tone as observed at the distant radio receiver can be used to identify the particular reflector. Alternatively a switch 19 and rotating cam 20 may be provided as in Fig. 12 to interrupt the modulating current in accordance with a telegraphic code symbol individual to the particular reflector marker. The lack of electrical inertia in the rectifier 21 permits alternatively the substitution of a speech current source for the device 22 so that the intercepted radio wave may have impressed on it a speech signal for the identification of the reflector or for the communication of intelligence to the distant receiver. An iris diaphragm 25 may be inserted at the junction of the horn and the pipe 1 to form a metallically bounded chamber which can be adjusted to improve the efficiency of operation.

Where a plurality of reflectors are to be differently oriented so as to cover a wide angular range as in Fig. 14, for example, and modulation is to be introduced to identify the array, the manner of interconnection of the reflector shown in Fig. 11 is not preferred. The disadvantage is that wave energy entering one horn would be to a certain extent conveyed to another horn and radiated therefrom in such direction as not to strike the remote receiver. As illustrated in Fig. 14, therefore, it is preferred that separate modulating circuits be provided for the several horn of the array. Each of the horns in Fig. 14 is provided at its throat end with a modulating element of the kind suggested with reference to Figs. 12 and 13. Each of these modulating elements is connected through a respective adjustable resistor 18 to a current source 27 which is intended to represent any of the sources suggested with reference to Figs. 12 and 13, viz., a battery, a low frequency tone source, a speech current source, with or without means for periodically interrupting the circuit. Fig. 15 shows one of the horns of Fig. 14 in schematic form. The arrangement is essentially the same as that of Fig. 13 except that a transverse coaxial line 28 has been inserted to facilitate impedance matching.

In view of the foregoing discussion of Figs. 1 to 15, inclusive, the manner of their application to the various forms of arrays shown in Figs 1 to 5 will be apparent.

Although the present invention has been described largely in terms of specific illustrative embodiments, it is evident that the invention is susceptible of various modifications and applications within the spirit and scope of the appended claims.

What is claimed is:

1. As a modulating radio reflector, a metallic horn for reflecting incident waves toward their point of origin, a power absorbing circuit at the smaller end of said horn in energy transfer relation with waves entering said horn, and means intermittently varying the power absorption characteristics of said circuit.

2. As a modulating radio reflector, a metallic horn for the interception and reradiation of electromagnetic waves toward their point of origin, said horn having a throat end, means electrically coupled to said throat end for controlling the reflecting efficiency of said horn, and means varying said reflecting efficiency in a predetermined time sequence whereby the amplitude of the reflected wave varies with time in a predetermined manner.

3. As a modulating radio reflector, a metallic horn for the interception and reradiation of electromagnetic waves, said horn having a throat end and a mouth end, a variable resistance at the throat end of said horn in power absorbing relation with waves entering the mouth end, and means for varying said resistance under the control of a tone wave, whereby the waves reflected by said horn are amplitude-modulated by said tone.

4. As a modulating radio reflector, a metallic horn for the interception and reradiation of electromagnetic waves, said horn having a throat end and means at said throat end for terminating said horn, and means for constituting said termination alternately an energy absorber and a reflector in predetermined time sequence.

5. In combination in a radio marker system comprising means for transmitting radio waves and means for detecting said waves received after reflection from a distant marker, a radio marker comprising a conductively bounded flared passage open to free space for the interception and reradiation of radio waves and shaped to reflect in a beam of substantially fixed predetermined direction radio waves incident upon it from any direction within a restricted angular range, and wave translating means electrically coupled to the interior of said passage and operative on the waves therein for modifying a parameter of the waves reflected relative to the same parameter of the incident waves whereby said marker may be identified at a distance by observing the relative modification of the transmitted and received waves.

6. A modulating radio reflection system comprising an electromagnetic horn for the interception and reradiation of radio waves, said horn having a throat end and a mouth end, an electrovariable resistance connected to the throat end of said horn in power-absorbing relation with waves entering the mouth end, and circuit means for varying said resistance whereby the waves reflected by said horn are modulated.

7. In combination, a unitary array of differently directed electromagnetic horns each constituting means for the interception of radio waves and reradiation thereof with beam effect, each of said horns having a throat end and a mouth end and means connected to the throat end for modulating waves being reradiated.

8. In combination with a distant radio wave transmitter, a radio antenna system comprising a relatively large radio wave intercepting and reradiating portion and a relatively small termination portion spaced beyond it in the direction of transmission of the received waves and closely coupled thereto so that the degree to which intercepted radio wave power is reradiated from said first-mentioned portion is substantially dependent on the electrical impedance presented by said termination portion to the intercepted waves reaching it, and means electrically coupled to said termination portion for varying the said impedance under the control of a modulating signal, whereby waves received from said transmitter are reradiated as signal-modulated waves.

9. In a radio system in which carrier power is radiated from a transmitter to a distant point and there modulated with a signal and reradiated to a distant signal-recovering receiver, the combination at said distant point of directive radio antenna means for intercepting the carrier power from said transmitter and reradiating said power toward said receiver, a conductively bounded transmission passage connected in radio wave transfer relation with said antenna means to carry the said carrier power being intercepted and reradiated, and modulating means connected to said passage to vary an electrical transmission characteristic of said passage under the control of modulating signal whereby the reradiated power is modulated in conformity with said modulating signal.

10. In a radio system in which carrier power is radiated from a transmitter to a distant point and there modulated with a signal and reradiated to a distant signal-recovering receiver, the combination at said distant point of a directive radio antenna system comprising a relatively large radio wave intercepting and reradiating portion, a relatively small reflecting terminal portion and means to converge upon said terminal portion the carrier wave power intercepted by said first-mentioned portion, and means electrically coupled to said terminal portion for varying the reflecting efficiency of said terminal portion in conformity with the variations of a modulating signal whereby the carrier wave power reradiated towards said receiver is modulated by said signal.

11. In a radio system in which carrier power is radiated from a transmitter to a distant point and there modulated with a signal and reradiated to a distant signal-recovering receiver, the combination at said distant point of a directive radio antenna system comprising a relatively large radio wave intercepting and reradiating portion and a relatively small reflecting terminal portion upon which the first-mentioned portion is adapted to converge the intercepted carrier wave power, said terminal portion comprising an electrical resonator, a variable impedance circuit coupled to said resonator, and means for varying the impedance of said circuit under the control of a modulating signal whereby the carrier wave power reradiated towards said receiver is modulated by said signal.

12. A system in accordance with claim 11 in which said variable impedance circuit includes a non-linear impedance element disposed within said resonator.

13. In a radio system in which carrier power is radiated from a transmitter to a distant point and there modulated with a signal and reradiated to a distant signal-recovering receiver, a modulating reflector comprising means defining a substantially continuous conductive expanse shaped to reflect in a substantially single beam of constant direction radio waves incident upon it from any direction within a restricted angular region, a conductively bounded transmission line opening into said expanse and coupled in energy transfer relation with the radio carrier waves being intercepted and reradiated, a variable impedance element connected to said line, and means for varying the impedance of said element under the control of a modulating signal.

14. In combination in a radio marker system comprising means for transmitting radio waves and means for detecting said waves received after reflection from a distant marker, a marker comprising an electromagnetic horn for the interception and reradiation of said waves, said horn having a throat end and a mouth end, a circuit coupled at the throat end of said horn in energy transfer relation with waves entering said horn, and means varying the electrical characteristics of said circuit repeatedly in preassigned manner whereby corresponding variations are impressed on the reflected waves.

15. A modulating radio reflector system comprising an electromagnetic horn for the interception of radio waves and reradiation thereof toward their point of origin, said horn having a mouth end and a wave reflecting throat end, and modulating means electrically coupled to the interior of said horn to modulate radio waves entering said mouth end and reflected from said throat end.

16. In combination with a transmitter of radio waves, an electromagnetic horn for the interception of said radio waves and reradiation thereof with beam effect, said horn having a mouth end and a throat end, means connected to said throat end for modulating the waves entering said horn and reradiated therefrom, and radio receiver means for receiving the modulated reradiated waves.

17. In combination in a system in which radio waves are radiated from a transmitter to a distant point and there modulated and reradiated, an electromagnetic horn at the said distant point for the interception and reradiation of said radio waves, said horn having a throat end and a mouth end, a wave reflecting barrier at the throat end of said horn, an electrical circuit including a variable impedance element coupled to the interior of said horn, said circuit including a modulating wave source for varying the impedance of said element under the control of a modulating wave whereby the said waves reradiated by said horn are correspondingly modulated.

18. In a modulating radio reflector system, radio wave reflecting means for efficiently reradiating in a fixed principal direction of action a radio wave that is incident upon it from any direction within a limited angular range, said reflecting means comprising a conductively bounded flaring passage having an opening to free space at its larger end for the admission and reradiation of the incident wave, and radio frequency circuit means connected in radio wave translating relation with said passage for modulating the incident wave being reflected.

19. In a modulating radio reflector system, radio wave reflecting means for efficiently reflecting back in the direction of its arrival a radio wave that is incident upon it from any direction within a limited angular range, said reflecting means comprising a conductively shielded wave transmission passage having a relatively large wave intercepting and reradiating portion and a relatively constricted reflecting portion in radio frequency transfer relation therewith, and modulating means electrically coupled in radio frequency transfer relation with said passage for variably dissipating the said incident wave being reflected.

20. In a modulating radio reflector system, radio wave reflecting means for efficiently reflecting back in the direction of its arrival a radio wave that is incident upon it from any direction within a limited angular range, said reflecting means comprising a conductively shielded flaring passage having a relatively large radio wave intercepting and reradiating passage portion and a relatively constricted passage portion, and modulating means electrically coupled to the interior of said passage in said constricted portion for variably absorbing the said incident wave being reflected.

21. In a radio system, antenna means for intercepting radio waves and reradiating said waves with directional effect, said antenna means having a relatively large wave intercepting and reradiating portion exposed to free space, a relatively constricted terminal portion spaced therefrom and means to converge upon said terminal portion waves intercepted by said first-mentioned portion whereby said portions are coupled in radio frequency energy transfer relation, and means electrically coupled to said terminal portion for modulating the waves being reradiated.

22. In combination in a system comprising means for transmitting radio waves and receiver means for detecting said waves after redirection thereof by a distant reflector, a reflector comprising a conductively bounded flared passage the larger end of which is open to intercept and reradiate said radio waves, and electrical means including a current dependent variable impedance element coupled in radio frequency wave translating relation to the interior of said passage for varying the impedance presented to waves in said passage in conformity with a modulating signal whereby the said modulating signal is impressed on the reflected waves and can be detected at said receiver means.

23. In combination with a distant radio wave transmitter, a radio wave redirector and modulator comprising antenna means for intercepting radio waves from said transmitter and reradiating said waves with predetermined directional effect, said antenna means having a relatively large radio wave intercepting and reradiating portion and a relative constricted tandem-connected terminal portion spaced beyond it in the direction of transmission of the received waves and in radio wave transfer relation therewith, a transmission line connected adjacent said constricted portion in low-loss radio wave transfer relation with said antenna means, and modulating means coupled to said line for varying the impedance presented by said terminal portion to said intercepted waves under the control of a modulating signal whereby the said reradiated waves are modulated in conformity with said modulating signal.

ARCHIE P. KING.

REFERENCES CITED

The following references are of record in the file of this patent:

UNITED STATES PATENTS

| Number | Name | Date |
| --- | --- | --- |
| 1,384,014 | Fessenden | July 5, 1921 |
| 1,999,278 | Britten | Apr. 30, 1935 |
| 2,101,785 | Wilckens | Dec. 7, 1937 |
| 2,151,118 | King et al. | Mar. 21, 1939 |
| 2,159,937 | Zworykin | May 23, 1939 |
| 2,212,110 | Beuermann | Aug. 20, 1940 |

FOREIGN PATENTS

| Number | Country | Date |
| --- | --- | --- |
| 825,438 | France | Dec. 8, 1937 |